(12) United States Patent
Tomimoto

(10) Patent No.: US 11,172,104 B2
(45) Date of Patent: Nov. 9, 2021

(54) CAMERA MOUNT, IMAGE-CAPTURING APPARATUS, AND MANUFACTURING METHOD OF CAMERA MOUNT

(71) Applicant: CANON KABUSHIKI KAISHA, Tokyo (JP)

(72) Inventor: Honkai Tomimoto, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/807,348

(22) Filed: Mar. 3, 2020

(65) Prior Publication Data

US 2020/0288046 A1 Sep. 10, 2020

(30) Foreign Application Priority Data

Mar. 7, 2019 (JP) .............................. JP2019-041445

(51) Int. Cl.
*H04N 5/225* (2006.01)

(52) U.S. Cl.
CPC ......... *H04N 5/2254* (2013.01); *H04N 5/2253* (2013.01)

(58) Field of Classification Search
CPC .. H04N 5/2254; H04N 5/2253; H04N 5/2257; G03B 17/14
See application file for complete search history.

(56) References Cited

U.S. PATENT DOCUMENTS

2019/0129117 A1* 5/2019 Nagaoka ................ G02B 7/022

FOREIGN PATENT DOCUMENTS

| CN | 204347412 U | 5/2015 |
| CN | 207340022 U | 5/2018 |
| CN | 109167897 A | 1/2019 |
| JP | 2010097093 A * | 4/2010 |
| JP | 5335362 B2 | 11/2013 |
| JP | 2014-240858 A | 12/2014 |

OTHER PUBLICATIONS

The above documents were cited in a Sep. 15, 2021 Chinese Office Action, which is enclosed with an English Translation, that issued in Chinese Patent Application No. 202010139495.1.

* cited by examiner

*Primary Examiner* — Ahmed A Berhan
(74) *Attorney, Agent, or Firm* — Cowan, Liebowitz & Latman, P.C.

(57) ABSTRACT

A camera mount consists of at least two layers which are laminated in an optical axis direction of an image-capturing lens. The camera mount is engaged with the image-capturing lens and detachably locks the image-capturing lens to a camera body. The camera mount includes a first mount layer; and a second mount layer, laminated on the first mount layer, made of a metal material and having a plurality of lens attachment claw portions configured to attach the image-capturing lens.

9 Claims, 5 Drawing Sheets

CAMERA MOUNT, IMAGE-CAPTURING APPARATUS, AND MANUFACTURING METHOD OF CAMERA MOUNT

BACKGROUND OF THE INVENTION

Field of the Invention

The present invention relates to a camera mount for attaching a lens. More specifically, the present invention relates to a camera mount that is integrally configured by laminating two mounts.

Description of the Related Art

Conventionally, in an interchangeable lens camera (for example, interchangeable lens single-lens reflex camera or interchangeable lens mirrorless single-lens camera) to which an image-capturing lens is detachably attachable, a camera mount configured by a metal portion and a synthetic resin portion has been put into practical use (See Japanese Patent No. 5335362).

Japanese Patent No. 5335362 discloses a two-piece camera mount (i.e. a camera mount that is integrally configured by laminating two mounts). The metal portion and the synthetic resin portion are integrally formed in a direction of an optical axis of the image-capturing lens, and a thickness of the metal part on an upper side with respect to the optical axis is thicker than that on a lower side with respect to the optical axis. Further, a first hole portion formed in the synthetic resin portion is fitted into a second hole portion formed in the metal portion, and a lock pin of the image-capturing lens is in contact with only the first hole portion. Moreover, the synthetic resin portion of the two-piece camera mount has a claw portion engaged with the image-capturing lens.

However, in the above-mentioned prior art document, the camera mount is a two-piece mount composed of a metal mount and a synthetic resin mount, and the metal mount is manufactured by a sintering method. In general, the sintering method is a process in which a metal powder is heated and hardened at a high temperature around a melting point, and a cost of parts produced using the sintering method is high. Moreover, since the claw portion is provided in a side of the synthetic resin mount, a strength of the claw portion is weak.

SUMMARY OF THE INVENTION

The present invention provides a camera mount capable of increasing a strength of the mount without increasing a manufacturing cost of components.

A camera mount as one aspect of the present invention consists of at least two layers which are laminated in an optical axis direction of an image-capturing lens. The camera mount is engaged with the image-capturing lens and detachably locks the image-capturing lens to a camera body. The camera mount includes a first mount layer and a second mount layer, laminated on the first mount layer, made of a metal material and having a plurality of lens attachment claw portions configured to attach the image-capturing lens.

An image-capturing apparatus as another aspect of the present invention includes the above camera mount and a camera body on which the camera mount is mounted.

A manufacturing method of the camera mount as another aspect of the present invention includes a step of forming a first mount layer by press working of a metal material or mold working of a synthetic resin and a step of forming a second mount layer by press working of a metal material, the second mount layer having a plurality of lens attachment claw portions configured to attach the image-capturing lens, wherein the step of forming the second mount layer includes a step of forming the plurality of lens attachment claw portions by press drawing.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the accompanying drawings.

First Embodiment

Figure 1A:
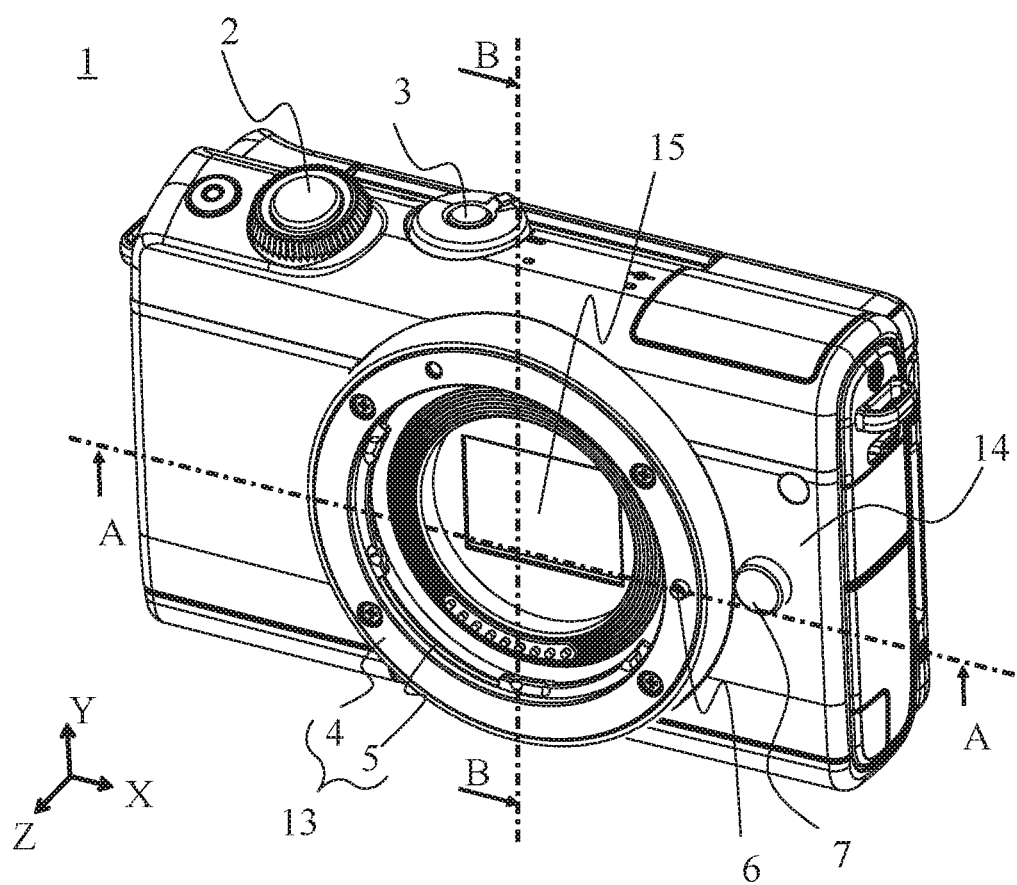
FIGS. 1A and 1B show perspective views of an image-capturing apparatus according to the present invention.
Figure 1B:
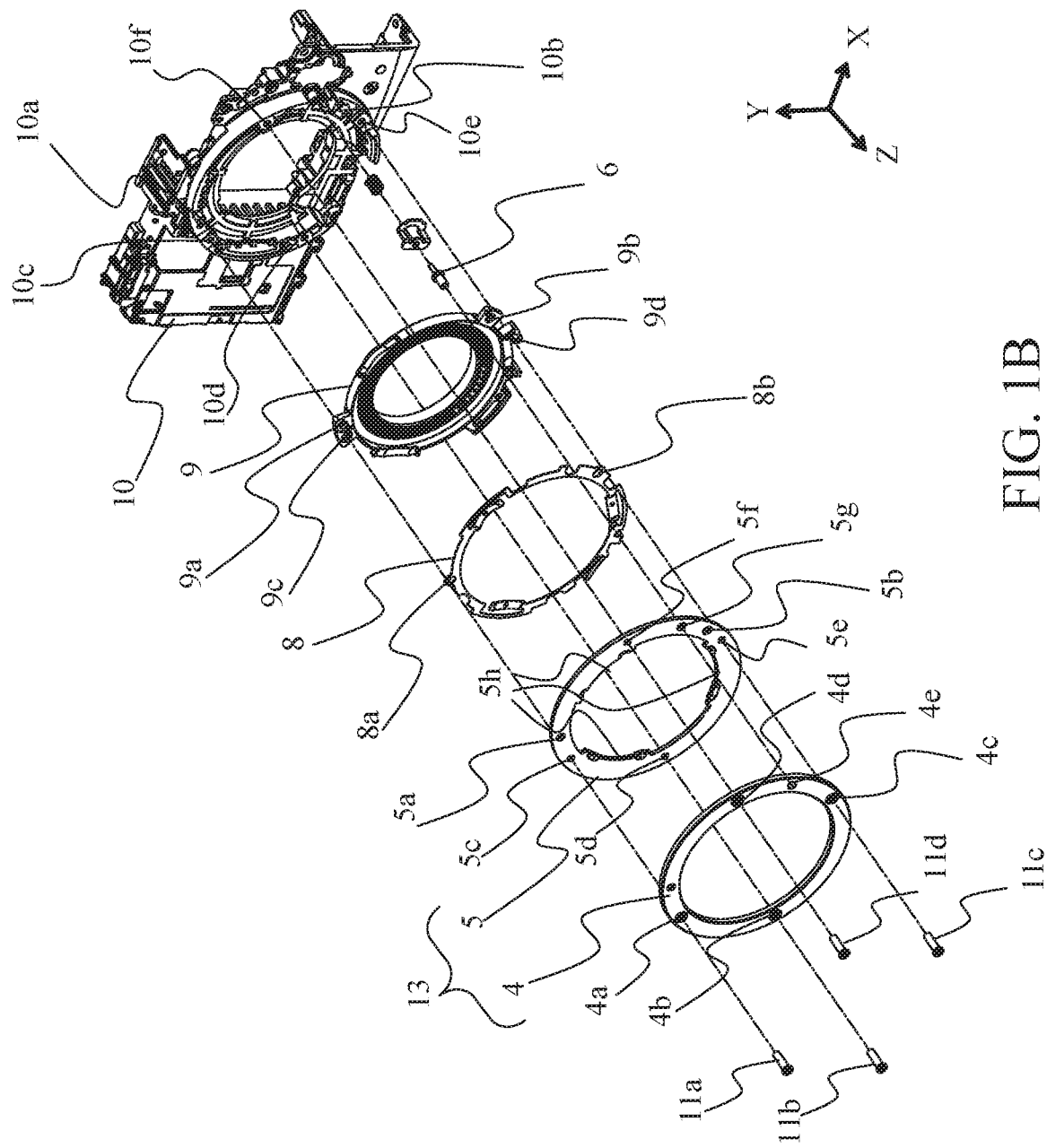

FIGS. 1A and 1B show external perspective views of a digital camera according to an embodiment of the present invention. FIG. 1A shows a front perspective view of an image-capturing lens interchangeable digital camera 1 that is an image-capturing apparatus according to the embodiment of the present invention, and FIG. 1B shows an exploded perspective view of a camera mount portion of the image-capturing lens interchangeable digital camera 1.

An axis parallel to an optical axis of the digital camera 1 is taken as a Z-axis, a height direction of the digital camera 1 is taken as a Y-axis, and a width direction (lateral direction) of the digital camera 1 is taken as an X-axis. The other drawings will also be explained with this definition of the X-, Y-, and Z-axes.

As shown in FIGS. 1A and 1B, the digital camera 1 includes a power button 3 having a power ON/OFF function of the image-capturing apparatus on its top surface and a release button 2 for instructing image-capturing preparation and image-capturing start. A camera mount 13 is used for detachably attaching (locking) an image-capturing lens (not shown) to a camera body. The camera mount 13 is a two-layer camera mount including a camera mount 4 and a camera mount 5 which are laminated in an optical axis direction (Z-axis direction). The camera mount 4 is called as an external camera mount 4 (first mount layer) because it is located on an object side and is on an external side. The camera mount 5 is called as an internal camera mount 5 (second mount layer) because it is located on a side of an image sensor 15 and is on an internal side.

The external camera mount 4 and the internal camera mount 5 have through holes 4e and 5g, respectively, and a lock pin 6 for locking the image-capturing lens (not shown) protrudes from the external camera mount 4. An unlock button 7 that is linearly movable protrudes from a front cover 14. The unlock button 7 is interlocked with the lock pin 6. In a case that a photographer detaches the not-shown image-capturing lens attached to the digital camera 1, the photographer presses an operation portion of the unlock button 7. The lock pin 6 is lowered from an external surface of the external camera mount 4 in conjunction with the linear movement of the unlock button 7. As a result, the image-capturing lens is unlocked from the digital camera 1, and the photographer can detach the photographing lens.

A lens communication contact unit 9 has an electrical contact that communicates with the image-capturing lens. The lock pin 6 is slidably fitted into the through hole 4e of the external camera mount 4. The lock pin 6 is not slidably fitted into the through hole 5g of the internal camera mount 5. A relationship between a diameter of the through hole 4e of the external camera mount 4 and a diameter of the through hole 5g of the internal camera mount 5 will be described later.

A mount spring 8 biases the image-capturing lens in the optical axis direction, and is disposed between the camera mount 13 and the lens communication contact unit 9.

The external camera mount 4, the internal camera mount 5, and the lens communication contact unit 9 are positioned with respect to a main body member 10 that is a main structure of the digital camera 1, and are fastened by screws 11a, 11b, 11c, and 11d. Specifically, bosses 10a and 10b for positioning protrude from the main body member 10, and the external camera mount 4 has two concave shapes (not shown) for positioning on a back side, and the internal camera mount 5 has holes 5a and 5b for positioning, and the lens communication contact unit 9 has holes 9a and 9b for positioning. The concave shapes for positioning of the external camera mount 4 and the holes 5a. 5b, 9a. 9b are positioned on the main body member 10 through the common bosses 10a and 10b. The main body member 10 is provided with screw seats 10c, 10d, 10e, and 10f for screw fastening, and the external camera mount 4 is provided with holes 4a, 4b, 4c, and 4d for screw fastening. The internal camera mount 5 is provided with holes 5c, 5d, 5e, and 5f for screw fastening, and the lens communication contact unit 9 is provided with holes 9c and 9d for screw fastening.

Screws 11a, 11b, 11c, and 11d are inserted through the holes 4a, 4b, 4c, and 4d, respectively, and further inserted through the holes 5c, 5d, 5e, and 5f, respectively. Only the screws 11a and 11c are inserted through the holes 9c and 9d, respectively. The screws 11a, 11b, 11c, and 11d are fastened to the screw seats 10c, 10d, 10e, and 10f, respectively. Thereby, the external camera mount 4, the internal camera mount 5, and the lens communication contact unit 9 are fixed to the main body member 10.

Figure 2A:
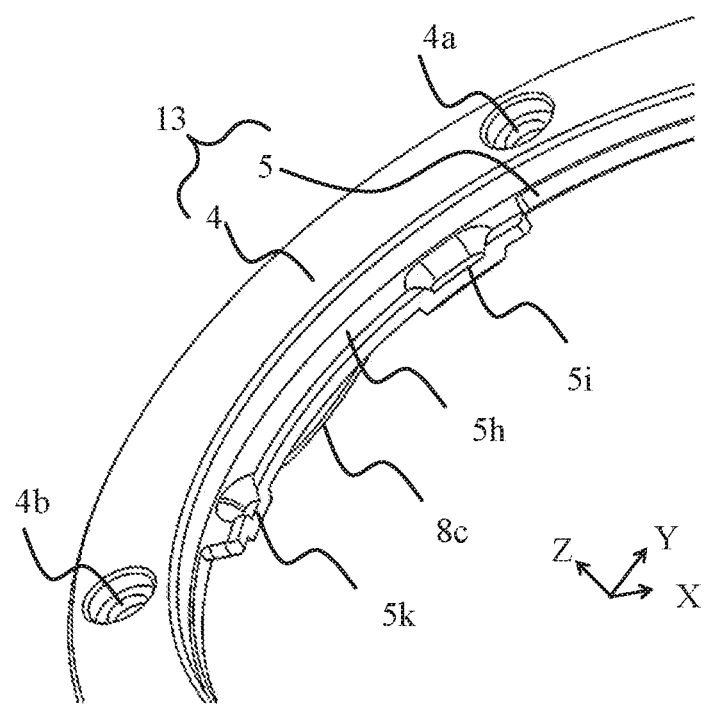
FIGS. 2A and 2B show enlarged views of a camera mount according to the present invention.
Figure 2B:
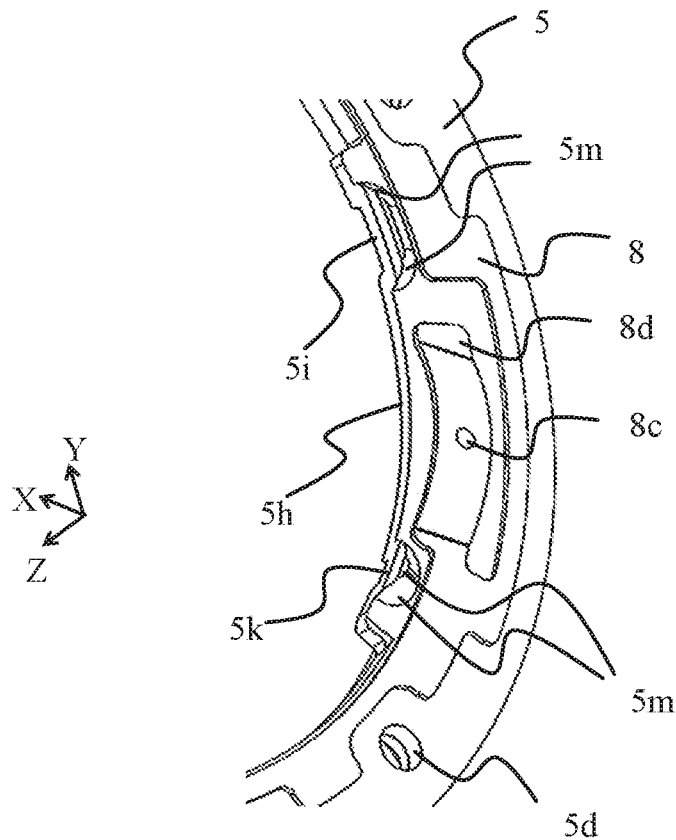

With reference to FIGS. 2A and 2B, a relationship among the external camera mount 4, the internal camera mount 5, and the mount spring 8 will be described. For ease of explanation, only a part of the three parts of the external camera mount 4, the internal camera mount 5, and the mount spring 8 is illustrated in FIGS. 2A and 2B.

FIG. 2A shows a perspective view of a claw portion of the camera mount as viewed from the external side, and FIG. 2B shows a perspective view of the claw portion of the camera mount as viewed from the internal side.

The external camera mount 4 is made by press working of a metal material, and the holes and the concave shapes are made by cutting. The internal camera mount 5 is made by press working of a metal material and is provided with three bayonet claws 5h. In FIGS. 2A and 2B, the two bayonet claws are not shown (see FIG. 1B). At both ends of the bayonet claw 5h, a plurality of claw portions (lens attachment claw portions) 5i and 5k of a lens attachment portion are provided. The lens attachment claw portions 5i and 5k are formed using a drawing process by a press molding method (press drawing) so that the lens attachment claw portions 5i and 5k are convex from a basic plane of the bayonet claw 5h toward the internal side (−Z-axis direction). Since it is made by the press drawing, the external side of the lens attachment claw portions 5i and 5k has a concave shape. The mount spring 8 has spring portions 8c. The spring portion 8c biases the image-capturing lens (not shown) in the optical axis direction (−Z direction). Since the spring portion 8c biases the image-capturing lens in the optical axis direction (−Z direction), the image-capturing lens contacts with the external surface of the external camera mount 4. The spring portion 8c is disposed between the lens attachment claw portions 5i and 5k. Even if the spring portion 8c is biased by attaching the image-capturing lens, a tip portion 8d of the spring portion 8c does not contact with the lens attachment claw portions 5i and 5k.

Since the lens attachment claw portions 5i and 5k are made by the press drawing, they have the convex shape from the basic plane toward the internal side (−Z-axis direction), and a sag shape 5m from a top of the convex shape toward the basic plane is formed. The sag shape 5m is a gentle slope with a curve. The sag shape 5m is provided with each end of each of the lens attachment claw portions 5i and 5k.

When the image-capturing lens is attached to or detached from the digital camera 1, the sag shape 5m of the lens attachment claw portions 5i and 5k of the internal camera mount 5 becomes an inviting shape that invites a bayonet claw 12b of a lens mount 12a described later. Thereby, the image-capturing lens can be easily attached to or detached from the digital camera 1.

In this embodiment, one bayonet claw 5h has been described, but the other two bayonet claws (not shown) have the same configuration as described.

In addition, in this embodiment, the lens attachment claw portions 5i and 5k whose shapes are formed using the drawing process by the press molding method are provided on the internal camera mount 5, but the external camera mount 4 and the internal camera mount 5 may be one integrated mount, and lens attachment claw portions whose shapes are formed by the drawing process in the same manner may be provided.

Figure 3A:
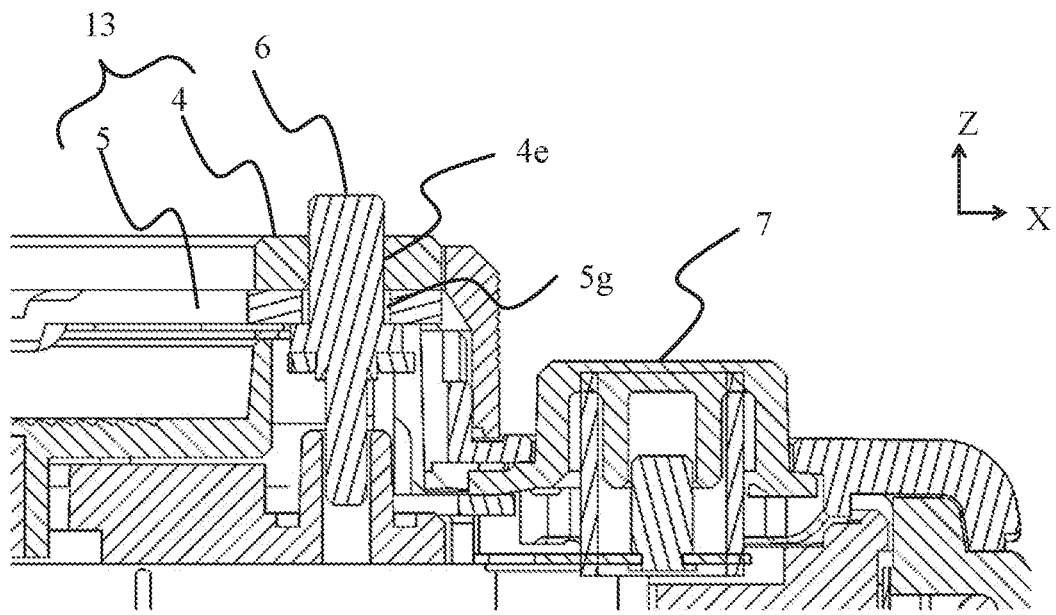
FIGS. 3A and 3B show cross-sectional views of the camera mount according to the present invention.
Figure 3B:
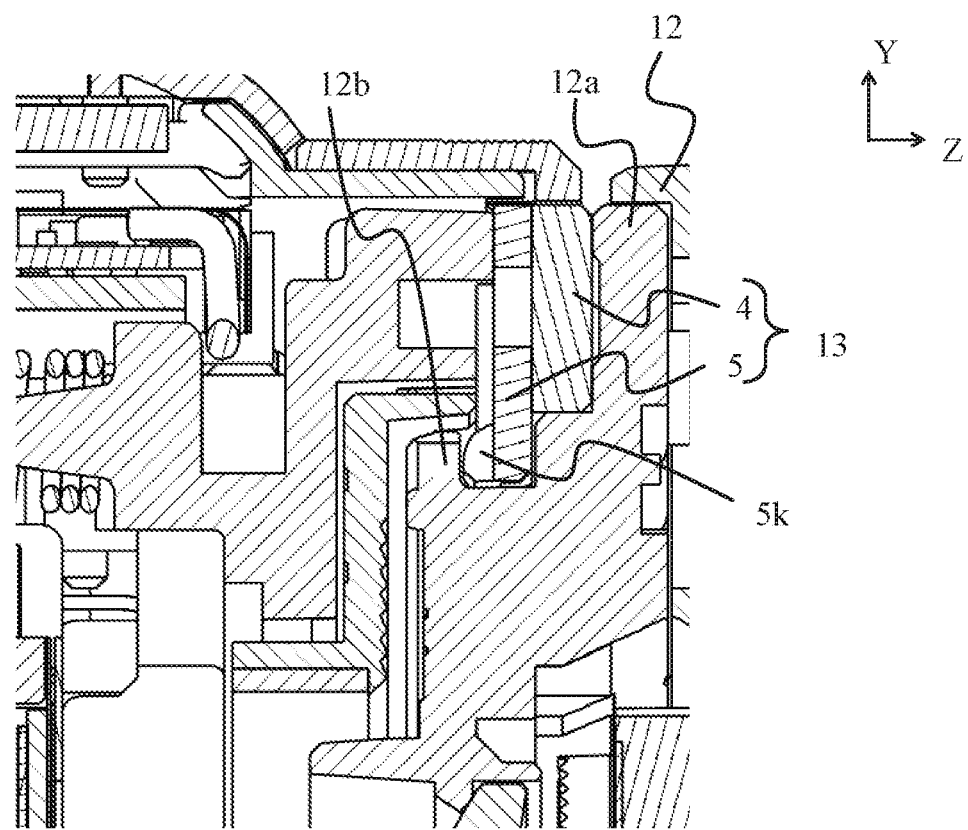

With reference to FIGS. 3A and 3B, the details of the camera mount 13 will be described. FIG. 3A shows a view of the XZ plane cut along an A-A cross section of FIG. 1A and shows a cross-sectional view around the lock pin 6 and the unlock pin 7. The A-A cross section intersects the optical axis.

As described above, the camera mount 13 includes the external camera mount 4 and the internal camera mount 5 which are laminated in the optical axis direction. The upper side of FIG. 3A is the object side, that is, the external side, and the lower side of FIG. 3A is the side of the image sensor 15, that is the internal side.

As described above, the lock pin 6 is slidably fitted into the through hole 4e of the external camera mount 4. The lock pin 6 is not slidably fitted into the through hole 5g of the internal camera mount 5. The lock pin 6 is lowered from the external surface of the external camera mount 4 in conjunction with the linear movement of the unlock button 7.

The diameter of the through hole 4e of the external camera mount 4 is smaller than that of the through hole 5g of the internal camera mount 5 (diameter: 4e<5g).

In this embodiment, although the diameter of the through hole 4e is smaller than that of the through hole 5g, the opposite configuration may be possible, i.e. the diameter of the through hole 5g may be smaller than that of the through hole 4e (diameter: 4e>5g). That is, one of the through holes is slidably fitted into the lock pin 6 and the diameter of the other through hole only needs to be larger than that of the one through hole.

FIG. 3B shows a view of the YZ plane cut along the B-B cross section of FIG. 1A, and shows a cross-sectional view of an upper portion of the camera mount 13 with the image-capturing lens 12 attached. The image-capturing lens 12 has the lens mount 12*a*, and the lens mount 12*a* is provided with the bayonet claw 12*b*. The bayonet claw 12*b* is located closer to the internal side than the lens attachment claw portion 5*k* of the internal camera mount 5 and engaged with the lens attachment claw portion 5*k* of the internal camera mount 5. The image-capturing lens 12 is biased by the spring portion 8*c* of the mount spring 8, and the lens mount 12*a* comes into contact with the external surface of the external camera mount 4.

As explained above, the camera mount includes the external camera mount and the internal camera mount which are laminated in the optical axis direction, and both the external camera mount and internal camera mount are made of press-worked metal, and the lens attachment portion of the internal camera mount is formed by the press drawing. Thereby, the strength of the camera mount can be maintained while reducing the manufacturing cost.

In this embodiment, the material of the external camera mount 4 is a metal, but the same effect can be obtained even if the material is a synthetic resin.

Further, in the above-described camera mount 13, unless the functions of the external camera mount 4 and the internal camera mount 5 are hindered, the relationship between them may be reversed.

Second Embodiment

Figure 4:
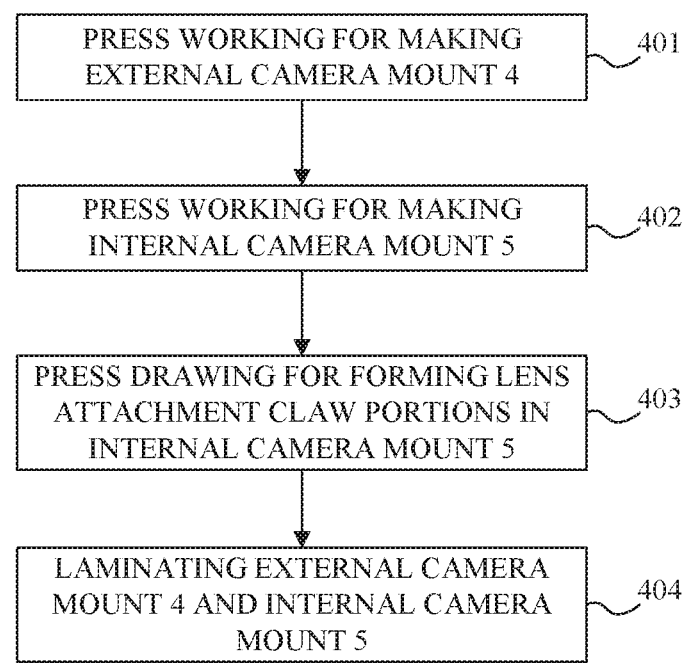
FIG. 4 shows a flow chart of a manufacturing method of the camera mount according to the present invention.

FIG. 4 shows a flowchart indicating a manufacturing method of the above-described camera mount 13 according to the second embodiment of the present invention.

Step 401 in FIG. 4 is a step in which the external camera mount 4 is made by the press working of a metal material. The holes and the concave shapes are formed by cutting. The external camera mount 4 may be made by mold working of a synthetic resin. Steps 402 and 403 are steps for making the internal camera mount 5. In step 402, the metal material is press-worked, and in step 403, the lens attachment claw portions 5*i* and 5*k* are formed by the press drawing for the second mount layer. In step 404, the camera mount 13 is made by laminating the external camera mount 4 and the internal camera mount 5 made in the above steps. Of course, the order of the step 401 for making the external camera mount 4 and the steps 402-403 for making the internal camera mount 5 may be reversed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-041445, filed on Mar. 7, 2019 which is hereby incorporated by reference herein in its entirety.

What is claimed is:

1. A manufacturing method of a camera mount consisting of at least two layers which are laminated in an optical axis direction of an image-capturing lens, the camera mount engaged with the image-capturing lens and detachably locking the image-capturing lens to a camera body, the manufacturing method comprising:
   a step of forming a first mount layer by press working of a metal material or mold working of a synthetic resin; and
   a step of forming a second mount layer by press working of a metal material, the second mount layer having a plurality of lens attachment claw portions configured to attach the image-capturing lens,
      wherein the step of forming the second mount layer includes a step of forming the plurality of lens attachment claw portions by press drawing.

2. The manufacturing method according to claim 1, wherein the plurality of lens attachment claw portions are a plurality of paired lens attachment claw portions, and
   wherein the plurality of paired lens attachment claw portions are arranged so that a spring portion of a mount spring which biases the image-capturing lens in the optical axis direction is located between the plurality of paired lens attachment claw portions.

3. The manufacturing method according to claim 1, wherein each of the plurality of lens attachment claw portions has a convex shape toward the optical axis direction from the image-capturing lens to the camera body when the image-capturing lens is attached to the camera body, and
   wherein the convex shape has a slope that curves from a top of the convex shape.

4. The manufacturing method according to claim 3, wherein the slope is provided with each end of the lens attachment claw portion.

5. The manufacturing method according to claim 1, wherein each of the first mount layer and the second mount layer is provided with a through hole enabling a lock pin which locks the image-capturing lens to linearly move,
   wherein the lock pin is slidably fitted into the through hole of one mount layer of the first and second mount layers, and
   wherein a diameter of the other mount layer is larger than that of the one mount layer.

6. The manufacturing method according to claim 1, wherein positioning when the first and second mount layers are fastened to the camera body is performed by a boss for positioning provided on the camera body, the boss being used in common between the first and second mount layers.

7. A camera body to which a camera mount is attached, wherein the camera mount is manufactured by using the manufacturing method according to claim 1.

8. An image-capturing apparatus comprising a camera body according to claim 7.

9. An image-capturing lens which is engaged with a camera mount, wherein the camera mount is manufactured by using the manufacturing method according to claim 1.

* * * * *